W. H. BRISTOL.
SHEET METAL SPROCKET RIM.
APPLICATION FILED JUNE 26, 1913.
1,098,473.
Patented June 2, 1914.
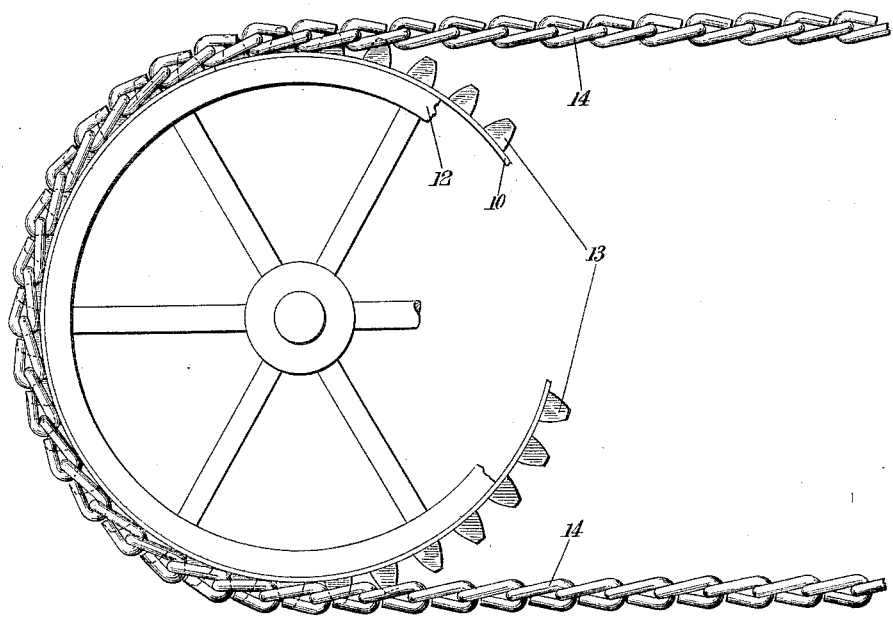
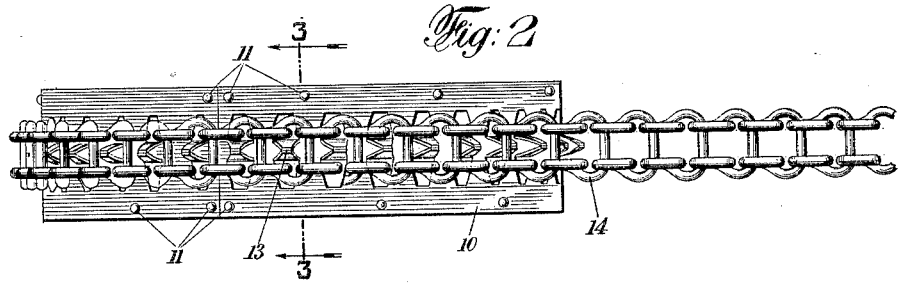
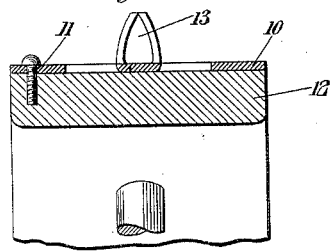
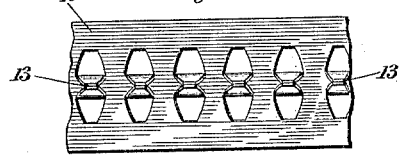
Witnesses:
John E. Prager
A. Worden Gibbs
Inventor
William H. Bristol
By his Attorney

UNITED STATES PATENT OFFICE.

WILLIAM H. BRISTOL, OF WATERBURY, CONNECTICUT, ASSIGNOR TO THE BRISTOL COMPANY, OF WATERBURY, CONNECTICUT, A CORPORATION OF CONNECTICUT.

SHEET-METAL SPROCKET-RIM.

1,098,473.

Specification of Letters Patent.

Patented June 2, 1914.

Application filed June 26, 1913. Serial No. 775,839.

*To all whom it may concern:*

Be it known that I, WILLIAM H. BRISTOL, a citizen of the United States, and resident of Waterbury, in the county of New Haven and State of Connecticut, have invented certain new and useful Improvements in Sheet-Metal Sprocket-Rims, of which the following is a specification.

The invention relates to sprocket wheels, and more particularly to wheels in which the rim is stamped up from sheet metal in the form of a toothed band suitable for attachment to a wheel or shaft.

The invention has for its object to readily and inexpensively stamp up bands of suitable material and of various lengths having teeth formed integrally therewith, and which bands may be attached to wheels and shafts of various diameters, the pitch of the teeth for a given chain being suited to the diameter of a wheel or shaft.

A further object of the invention is to so arrange the teeth of the said band that the edges of the same lie substantially in the direction of its length, thereby affording teeth of maximum strength.

In the accompanying drawings which illustrate the invention—Figure 1 is an elevation of a wheel to which the sprocket band has been attached and of a chain engaging the same. Fig. 2 is a plan thereof. Fig. 3 is a transverse section, on an enlarged scale, and taken on the line 3—3, Fig. 2, the chain being omitted. Fig. 4 is an enlarged plan of the sprocket band and teeth, the former being shown flattened to lie in a plane.

Similar characters of reference designate corresponding parts throughout the several views.

Referring to the drawings, 10 designates a band of sheet metal, somewhat flexible and of the requisite strength. The same is provided at various points along its length with perforations 11 through which suitable nails, screws or bolts may be brought to attach it to a support, for example, a wooden or metal wheel 12 as shown. From the band 10 there are cut transversely to its length, and preferably in pairs, teeth 13 in the form of spurs projecting upwardly at predetermined intervals along the band, the said intervals being determined with respect to a given chain 14 by the diameter of the wheel 12 to which the band is to be secured. If the metal be of sufficient thickness and strength, single spurs may be employed as teeth instead of pairs of spurs. The size of the teeth in either case remains the same for most purposes, but their pitch is varied as aforesaid. The spurs forming the teeth 13 and thus extending upwardly from the said band are arranged to lie substantially in the direction of the band and are tapered to provide the desired contour of the tooth. The tips of the corresponding spurs of the various teeth are, furthermore, preferably turned over to meet each other to reinforce the teeth, which, moreover, in view of the edge-wise arrangement are of maximum strength with respect to the amount of material employed. Teeth of such shape, also, readily engage with the links of the chain 14 and do not tend to interfere therewith when coming into engagement, allowing the chain to run at a high rate of speed.

I claim:—

1. A sprocket having a rim consisting of a flexible band of suitable material adapted to conform to and to be attached to a support, and individual spurs integral therewith and extending upwardly therefrom in pairs in the direction of its length and at predetermined intervals along the band.

2. A sprocket having a rim consisting of a flexible band of suitable material adapted to conform to and to be attached to a support, and oppositely disposed coacting spurs integral therewith and extending upwardly therefrom in the direction of its length and at predetermined intervals along the band and the tips of the pairs of spurs being turned over to meet each other.

3. A sprocket having a rim consisting of a flexible band of suitable material adapted to conform to and to be attached to a support, and oppositely disposed coacting spurs integral therewith and extending upwardly therefrom in the direction of its length and at predetermined intervals along the band, the said spurs being suitably tapered and the tips of the various pairs thereof turned over to meet each other.

Signed at New York, in the county of New York, and State of New York, this 24th day of June, A. D. 1913.

WILLIAM H. BRISTOL.

Witnesses:
FREDK. F. SCHUETZ,
LAURA E. SMITH.

Copies of this patent may be obtained for five cents each, by addressing the "Commissioner of Patents, Washington, D. C."